(No Model.)
M. W. LEONHARDT.
BOLTING REEL.
No. 436,247. Patented Sept. 9, 1890.
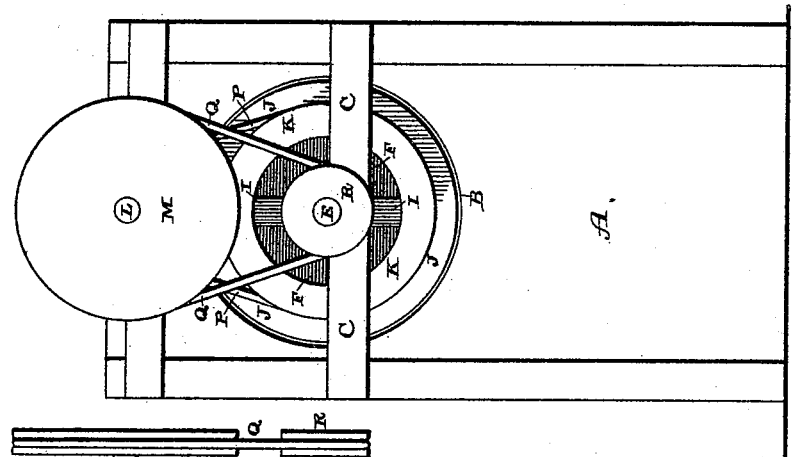
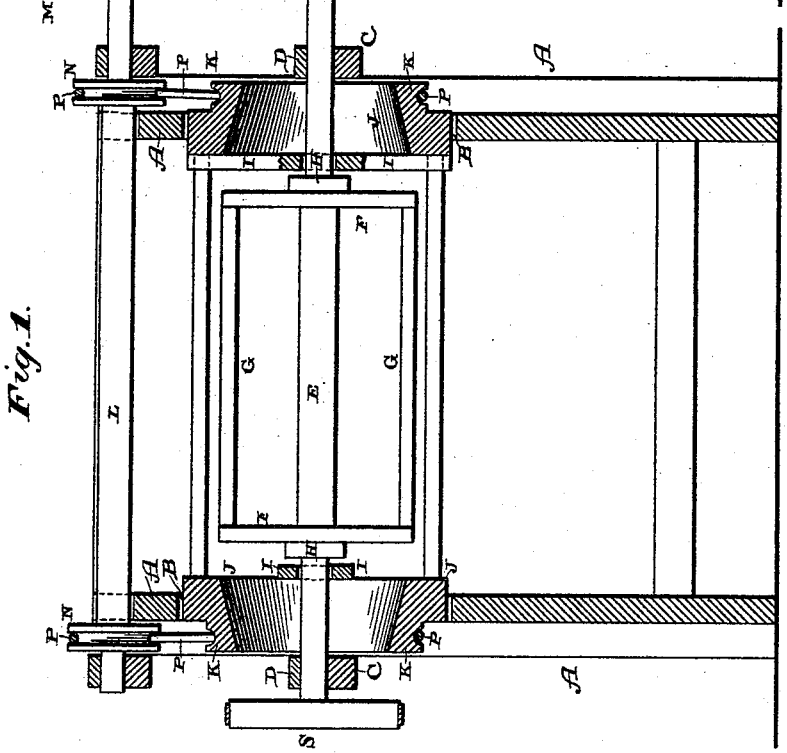
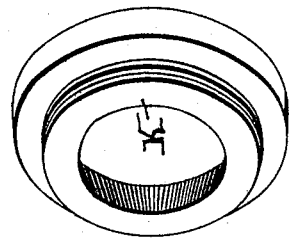
Witnesses:
E. P. Ellis,
J. M. Nesbit,
Inventor:
M. W. Leonhardt,
per
Lehmann & Pattison,
attys.

UNITED STATES PATENT OFFICE.

MARTIN WILLIAM LEONHARDT, OF ST. LOUIS, MISSOURI.

BOLTING-REEL.

SPECIFICATION forming part of Letters Patent No. 436,247, dated September 9, 1890.

Application filed June 25, 1890. Serial No. 356,623. (No model.)

*To all whom it may concern:*

Be it known that I, MARTIN WILLIAM LEONHARDT, of St. Louis, in the State of Missouri, have invented certain new and useful Improvements in Bolting-Reels; and I do hereby declare the following to be a full, clear, and exact description of the invention, such as will enable others skilled in the art to which it pertains to make and use it, reference being had to the accompanying drawings, which form part of this specification.

My invention relates to an improvement in bolting-reels; and it consists in the construction and arrangements of parts, which will be fully described hereinafter.

The object of my invention is to construct a bolting-reel so that the reel proper is partially or wholly supported by the driving belts or chains, and the beater-shaft prevented from getting "out of center" or its proper relative position to the reel, and thus prevent injury by the beaters engaging the ends of the reel, and by this construction reduce the friction of the parts.

Figure 1 is a vertical section of a reel which embodies my invention. Fig. 2 is an end view of the same. Fig. 3 is a detached perspective of one end of the reel.

A represents the frame, which is provided with circular openings B in its end pieces, and extending across these openings are the horizontal supports C, to which are secured suitable bearings D. Journaled in these bearings is a shaft E to which is secured the heads F, in the peripheries of which the beaters G are secured. Outside of these heads F, upon the shaft E, are the guides or bearings H, against which the cross-pieces I of the reel-heads J abut, and which prevent the reel-heads J and beaters from getting out of center in relation to each other. By means of this construction the beaters are prevented from coming in contact with the ends or heads of the reel, and thus damaging the reel by continually and alternately knocking the ends of the reel. The reel-heads, as here shown, are provided with the pulleys K, around which the driving and supporting belts pass, as will hereinafter appear.

Extending longitudinally across the frame above the reel is a shaft L, which is journaled in suitable bearings secured to the frame. Secured to this shaft at one end is a large pulley M and also two small pulleys N. Passing around the pulleys N and the pulleys upon the reel-heads, which are considerably larger than the pulleys N, are the belts or chains P, and which either wholly or partially support the weight of the reel, as may be desired. This shaft L is driven by means of a belt or chain Q, which passes around the large pulley M and a smaller pulley R, which is secured upon one end of the beater-shaft, as shown. Secured to the opposite end of the beater-shaft is the driving-pulley S. By means of this construction the power is applied directly to the beater-shaft, and by the arrangement and difference in the size of the pulleys the beater-shaft is driven at a much higher speed than the reel, which causes a centrifugal movement of the flour in the reel, while the reel revolves in the same direction as the beaters. This movement of the beaters is very effective, as is found in actual use. In this arrangement the friction of the reel upon the beater-shaft is partially or wholly relieved, as the reel is either wholly or partially supported by the belts which pass around the pulleys that are secured to its heads, and the pieces which extend across the heads of the reel and the shoulders or bearings upon the beater-shaft merely serve as guides to prevent the reel and beater-shaft from getting out of center.

If desired, a portion of the weight of the reel may be supported by the cross pieces or guides I, through which the beater-shaft passes, by not having the belts P sufficiently tight to sustain the entire weight of the reel.

If desired, the bearings through which the shaft L passes may be made vertically adjustable in any well-known manner, by means of which the belts can be made to either partially or wholly support the weight of the reel; but this adjustment is not at all necessary.

Having thus described my invention, I claim—

1. In a bolting-reel, the combination of the supporting-frame, the reel having heads, concentric pulleys secured to the said heads, a shaft above the reel-carrying pulleys, center guides or bearings secured to the reel-heads, and a shaft passing through the guides, substantially as specified.

2. In a bolting-reel, the combination of the supporting-frame, the reel having heads, concentric pulleys and center guides or bearings secured to the said heads, a shaft passing through the said bearings, beaters secured to the shaft between the reel-heads, bearings or guides upon the shaft between the beaters and the reel-heads, a shaft above the reel-carrying pulleys, and belts which pass around said pulleys and the concentric pulleys, substantially as shown.

3. In a bolting-reel, the combination of the supporting-frame, the reel having heads provided with concentric pulleys and center guides or bearings, a shaft passing through the center guides having pulleys on its ends, a shaft above the reel carrying two pulleys, belts which pass around the said pulleys and the reel concentric pulleys, and a third pulley upon the last said shaft, and a belt which passes around the last said pulley and one of the pulleys upon the shaft which passes through the reel, and beaters upon the last said shaft, substantially as described.

4. In a bolting-reel, the combination of a supporting-frame, a reel having heads provided with concentric pulleys, a shaft which passes through the reel and having beaters secured thereto, and a pulley upon one end, a shaft above the reel having two pulleys of smaller diameter than the reel concentric pulleys, a belt which passes around the said small pulleys and the concentric pulleys, and a large pulley upon the last said shaft, a belt which passes around the last said large pulley and the pulley upon the central shaft, and a driving-pulley upon the opposite end of said central shaft, whereby the beaters revolve more rapidly than the reel, substantially as specified.

In testimony whereof I affix my signature in presence of two witnesses.

MARTIN WILLIAM LEONHARDT.

Witnesses:
 JAMES BUNDESEN,
 HENRY M. RABOLD.